United States Patent [19] | [11] 4,184,395
Blachly et al. | [45] Jan. 22, 1980

[54] RADIAL ARM SAW

[75] Inventors: Donald L. Blachly, Chesterfield; Brian R. Hochstatter, Florissant; Robert L. O'Hearne, Kirkwood, all of Mo.

[73] Assignee: Emerson Electric Co., St. Louis, Mo.

[21] Appl. No.: 895,182

[22] Filed: Apr. 10, 1978

[51] Int. Cl.$^{2}$ .......................... B27B 5/20; B23D 45/02
[52] U.S. Cl. .................................... 83/486.1; 83/471.3
[58] Field of Search ............................ 83/471.3, 486.1; 144/134 B

[56] References Cited

U.S. PATENT DOCUMENTS

| | | | |
|---|---|---|---|
| Re. 27,565 | 1/1973 | Botefuhr | 83/471.3 |
| 2,942,632 | 6/1960 | Cassey | 83/486.1 |
| 3,023,792 | 3/1962 | Palmer et al. | 83/486.1 |
| 3,104,687 | 9/1963 | Field | 83/486.1 |
| 3,299,916 | 1/1967 | Packard et al. | 83/486.1 |

*Primary Examiner*—Donald R. Schran
*Attorney, Agent, or Firm*—Charles E. Markham

[57] ABSTRACT

A radial arm saw has separate and independently adjustable actuating means operated by a single lever for indexing the arm in spaced miter positions and for clamping it in infinitely variable miter positions, a novel arm clamp shoe, an adjustable arm index ring, adjustable guide means including adjustable guide means guiding vertical movement of the arm, composite arm indexing pin, bevel and swivel indexing pin ramps, a heel adjustment cam, and adjustable bevel clamp means.

9 Claims, 20 Drawing Figures

RADIAL ARM SAW

This invention relates to radial arm saws and particularly to an economical and reliable construction which is convenient to operate and adjust.

The prior art most pertinent to their invention known to applicants and their representative is disclosed in U.S. Pat. Nos. 2,942,632, 3,023,792, 3,104,687, 3,294,219, and 3,482,610.

OBJECTS OF THE INVENTION

The primary object of the invention is to provide a generally new and improved radial arm-type power-driven saw which is reliable, economical to construct, and convenient to operate and adjust.

A further object is to provide novel and conveniently adjustable means for guiding vertical movement of the radial arm;

A further object is to provide a novel composite indexing pin for indexing the radial arm in spaced mitering position;

A further object is to provide novel clamp shoe means for clamping the radial arm in infinitely variable mitering positions;

A further object is to provide novel independently adjustable means operated by a single hand lever for actuating the radial indexing pins and the clamp shoe;

A further object is to provide novel and conveniently operated and adjustable means for clamping the saw blade in infinitely variable bevel positions;

A further object is to provide novel and convenient cam means for heel adjustment of the saw blade shaft;

A further object is to provide a conveniently adjustable radial arm indexing ring;

A further object is to provide ramp means for the convenient withdrawal of bevel and swivel indexing pins; and A further object is to provide a radial arm saw having a radial arm carried on the upper end of a cylindrical member vertically slidable in a two-piece, longitudinally divided support column having longitudinally spaced, semicircular guide surfaces therein adjustably embracing the vertically slidable cylindrical member.

Other objects and advantages will appear upon reading the following description in connection with the accompanying drawings.

THE DRAWINGS

FIG. 14 is a cross-sectional view of the saw motor yoke and carriage assembly taken along lines 14—14 of FIG. 13;

DESCRIPTION

Figure 1:
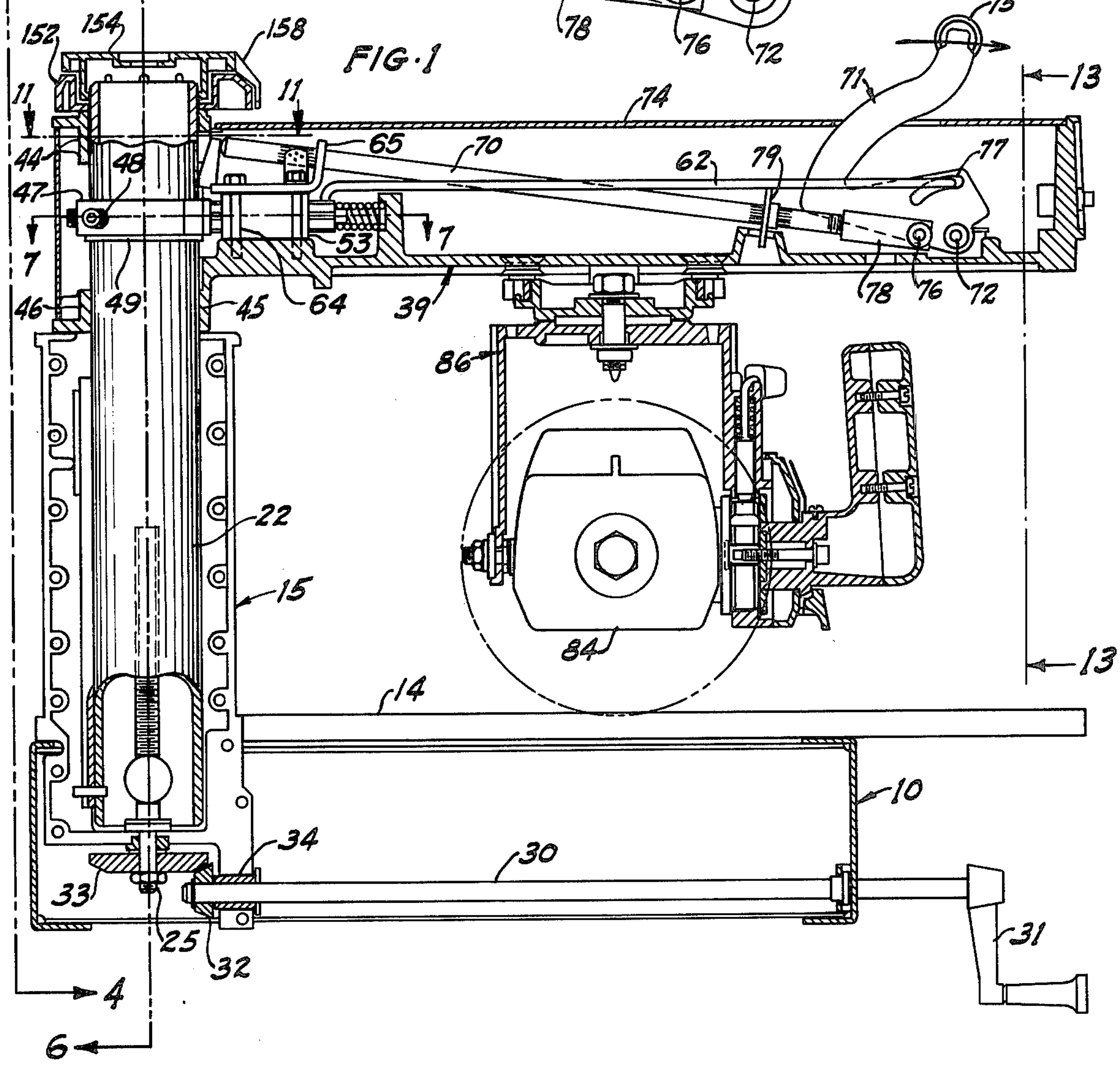
FIG. 1 is a partially sectionalized side elevational view of a radial saw constructed in accordance with the present invention.
Figure 20:
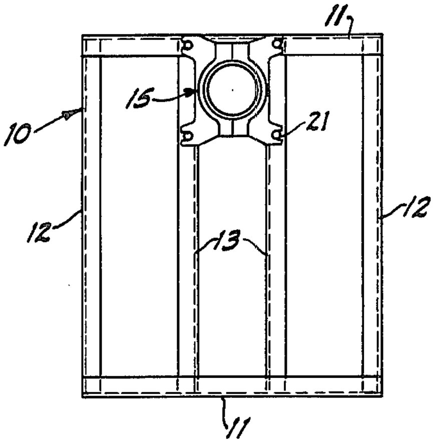
FIG. 20 is a top plan view of the base on which the radial saw is mounted.
Figure 13:
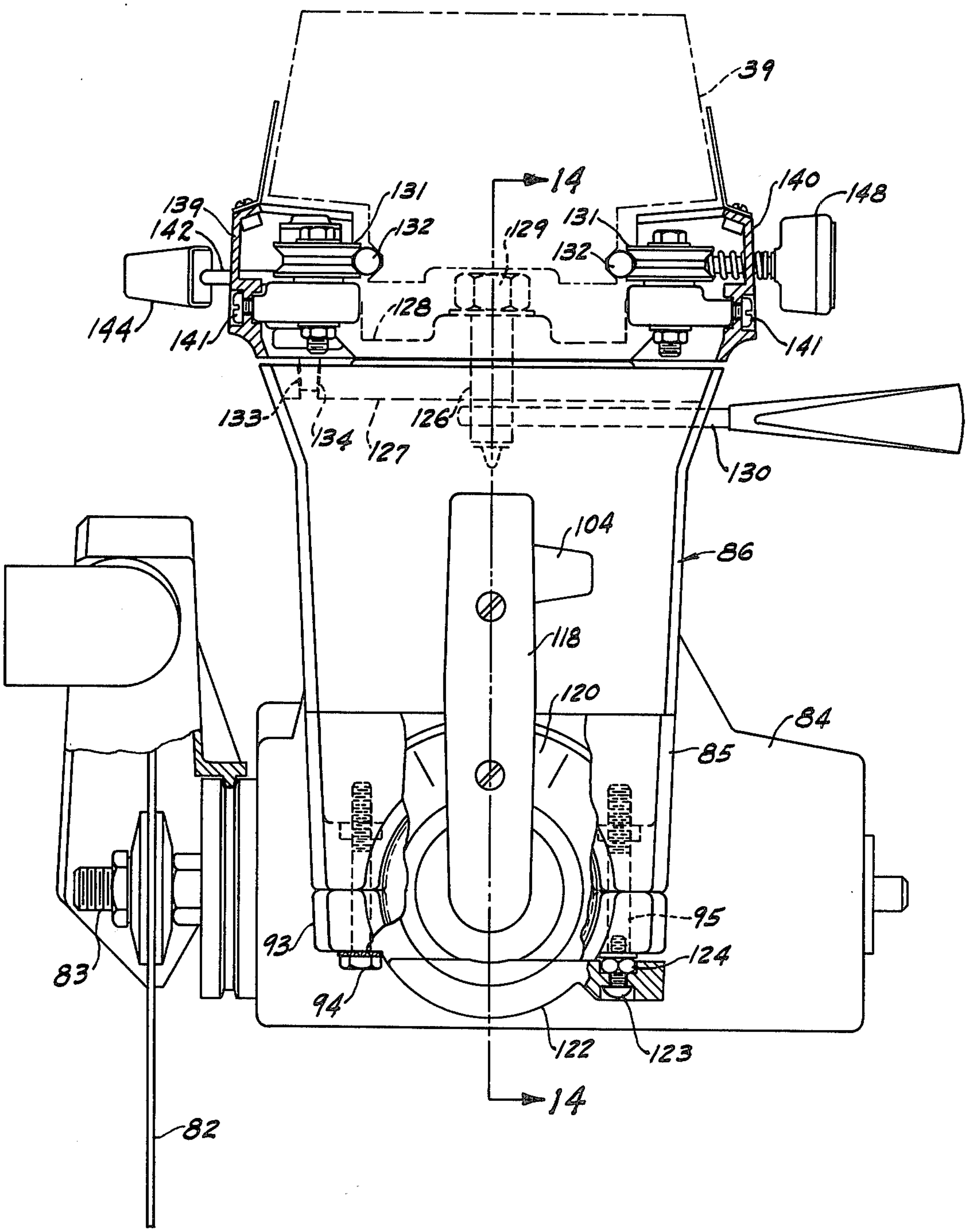
FIG. 13 is an enlarged elevational view of the saw motor yoke and carriage assembly taken along line 13—13 of FIG. 1.

Referring to FIGS. 1 and 20 of the drawings, a rectangular base 10 is constructed of front and rear channel members 11, side channel members 12, and two intermediate channel members 13 extending from front to rear. The base channel members are suitably rigidly connected, as by welding, and a worktable 14 of suitable material is fastened to the upper surface of the base. In the interest of economy all of the base channels may be substantially the same in form and length, resulting in a substantially square base, and this arrangement is contemplated.

A hollow, vertically arranged support column 15 is attached at its lower end to the flanges of rear and intermediate base channel members 11 and 13 and to the webs of channel members 13. The support column 15 is formed of two generally semicylindrical left and right-hand sections 16 and 17 which preferably are formed as metal die castings and each of which includes longitudinally extending front and rear connecting flanges 18 and 18'. Connecting bolts 19, having attached nuts, pass through suitable clearance holes in the flanges 18 and 18' and connect the column sections 16 and 17 together. Hear their lower ends, the column sections 16 and 17 include transverse base flanges 20 which receive attaching bolts 21 connecting the support column 15 to the flanges of the base channels 11 and 13. The lower end portions 20' of sections 16 and 17 are also connected to the webs of channel members 13 by screws 21'. The half sections 16 and 17 of support column 15 further include transverse internal web portions near their lower ends which together form a closure or floor 28, see FIG. 6.

A hollow, cylindrical, radial arm support tube 22 is arranged in the hollow support column 15 for vertical sliding movement. A longitudinally extending motion transmission screw 23 concentrically arranged in tube 22 is threadedly engaged in a transversely elongated nut 24, which nut is entered at its ends in apertures in the wall of tube 22 near its lower end. The screw 23 is supported at its lower end on the floor 28 of the support column 15. Rotation of screw 23 therefore causes tube 22 to move vertically.

A lower reduced diameter portion 25 of screw 23 extends downward through a clearance hole in the floor 28 of the support column 15. This reduction in the diameter of screw 23 provides a shoulder, and an end thrust bearing 26 is interposed between this shoulder and the floor 28. There is also a radial thrust bearing 27 entered into a counterbore in the lower surface of floor 28.

The rotation of screw 23 to impart vertical movement to tube 22 is accomplished by rotation of a horizontal shaft 30 by a hand-operated crank 31 and by transmission of this shaft rotation to the screw 23 through force multiplying smaller and larger meshed bevel gears 32 and 33, respectively. The shaft 30 is journalled near its front end in the front base channel 11 and at its rear end in a suitable bearing 34 mounted in a downward extension of support column 15. The bevel gear 32 is suitably fixed on the rear end of shaft 30 and bevel gear 33 is suitably fixed on the lower end portion 25 of screw 23.

Figure 4:
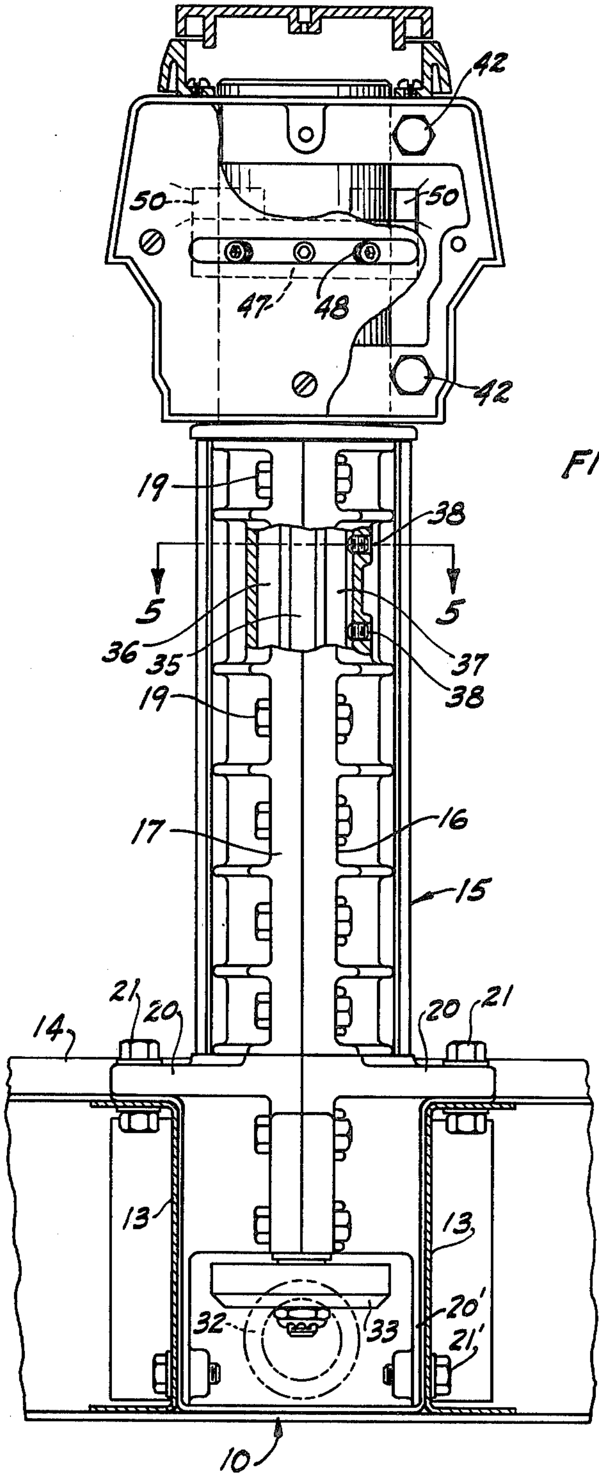
FIG. 4 is a front elevational view taken along lines 4-4 of FIG. 1.
Figure 5:
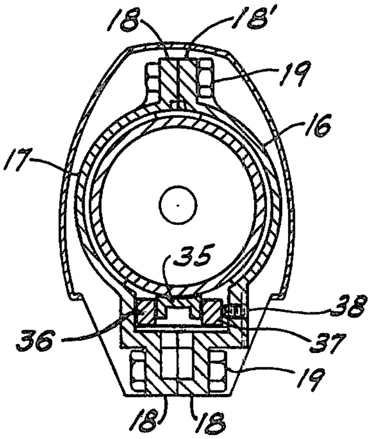
FIG. 5 is a transverse cross-sectional view of the two-piece support column and arm elevating tube showing the adjustable guide gib and is taken along line 5—5 of FIG. 4.
Figure 6:
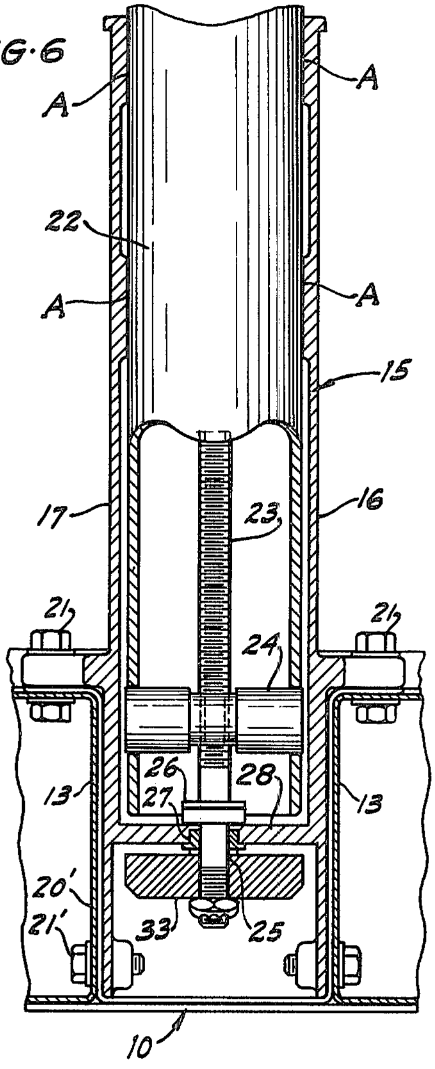
FIG. 6 is a partial cross-sectional elevational view taken along line 6—6 of FIG. 1.

The tube 22 is loosely fitted in the hollow support column 15, but is closely guided for vertical movement therein by two pairs of aligned and vertically spaced arcuate guide pads A on the half sections of the support column and is closely held against any rotative movement by a longitudinal guide strip 35 securely attached to the tube 22 and having a close sliding fit between two vertically arranged elongated gibs 36 and 37, see FIGS. 4 and 5. Referring to FIGS. 4 and 6, it will be noted that the upper two pairs of connecting bolts and nuts 19 are positioned substantially centrally of the two pairs of arcuate guide pads A and that the guide gibs 36 and 37 are positioned vertically between the upper and lower guide pads.

In order to provide adjustment of the guide pads A, the relation of the diameter of the tube 22 to the radii of the guide pads A is made such that, when the upper two pairs of bolts 19 are fully tightened, the tube 22 is tightly gripped by the arcuate guide pads. However, when the upper two bolts 19 at one side of the support column are slightly loosened, the pressure of guide pads A against the tube 22 will be decreased so that the tube 22 may move vertically freely. This occurs because of the inherent elasticity of of the support column walls. Obviously, very little deformation of the arcuate walls of the support column, and well within the elastic limit, is required to provide this adjustment. Also, in this arrangement, the relative tightness of the upper two bolts 19 at one side only of the support column may be varied to attain a smooth desirable fit of the tube and guide pads. Preferably the two upper bolts 19 at the rear side of the support column are identified by coloring, or the like, as the adjusting bolts.

The gib 36 is fixed in one half section of the support column, while the gib 37 is mounted for transverse movement in the other half section toward and away from the guide strip 35. A pair of vertically spaced set screws 38 threadedly engaged in the support column bear against one side of the gib 37 and provide means for adjusting the alignment of the gib as well as the sliding fit of the guide strip 35 between the gibs. It will be understood that prior to making any adjustment of the guide pad A, the set screws 38 are backed off so that the position of gib 37 will not interfere with adjustment of the guide pads A. After suitable adjustment of the guide pads A is made, the gib 37 is suitably adjusted.

A radial arm generally indicated at 39 is mounted for rotation on the upper end of arm support tube 22. The arm 39 comprises a forwardly extending main arm section 40 and a short rear section 41 rigidly connected to the main section by screws 42. The main and rear sections 40 and 41 each have vertically spaced upper and lower aligned pairs of semicylindrical bearing surfaces 43 and 44, and 45 and 46, which meet to form two vertically spaced cylindrical bearing surfaces embracing the tube 22, see FIGS. 1, and 12. Positioned between the upper and lower bearing surfaces is a miter indexing ring 47 fitted on and adjustably connected to the tube 22 by three set screws 48. The set screws are threadedly engaged in the ring and bear against the wall of the tube 22.

Figure 7:
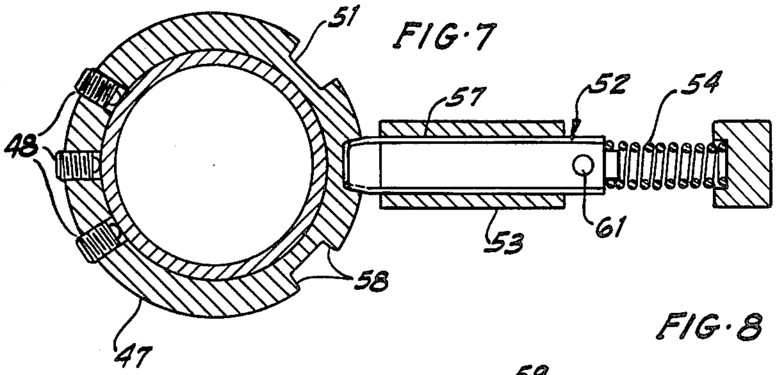
FIG. 7 is an enlarged transverse cross-sectional view taken along lines 7—7 of FIG. 1, showing the radial arm indexing latch ring and pin.
Figure 12:
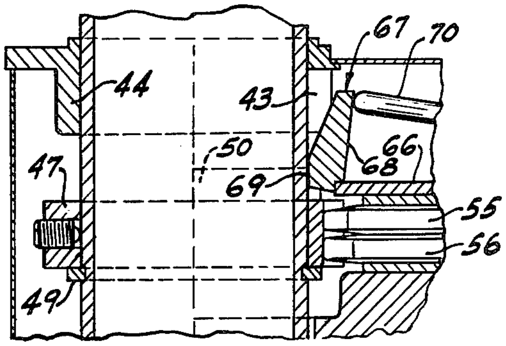
FIG. 12 is an enlarged fragmentary cross-sectional view taken along lines 12—12 of FIG. 11.

Immediately below the miter indexing ring 47 a snap ring 49 entered into an annular groove in tube 22 prevents downward movement of the index ring 47 when adjustments thereof are being made, see FIG. 12. The radial arm 39 is supported for rotation on the upper surface of miter index ring 47 by arcuate ledge portions 50 cast integrally with the main arm section 40, see FIGS. 4 and 12. The miter indexing ring 47, see FIG. 7, has three index pin receiving notches 51 therein spaced forty-five angular degrees apart. A composite miter index pin 52 freely slidable in a casing 53 is biased by a spring 54 to enter any of the notches 51 when brought into registry by rotation of radial arm 39.

Figure 8:
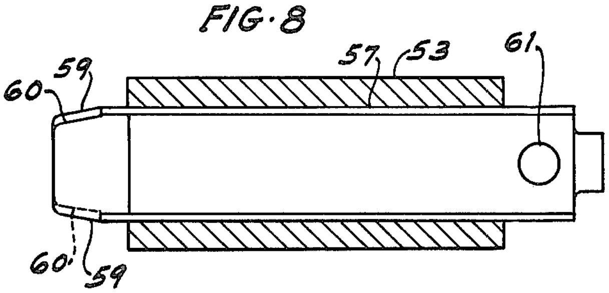
FIG. 8 is a still further enlarged top plan view of the two-piece arm index pin.
Figure 10:
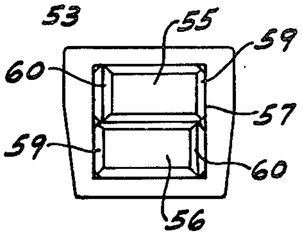
FIG. 10 is a front end elevational view of the two-piece arm indexing pin shown in FIGS. 8 and 9.
Figure 9:
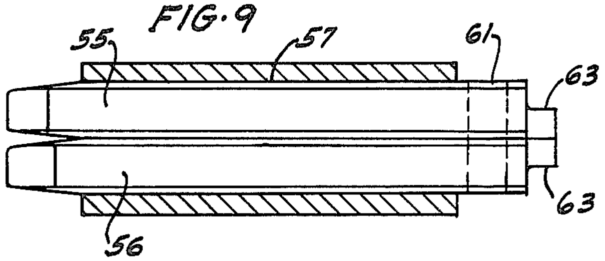
FIG. 9 is a side elevational view of the two-piece arm indexing pin shown in FIG. 8.
Figure 11:
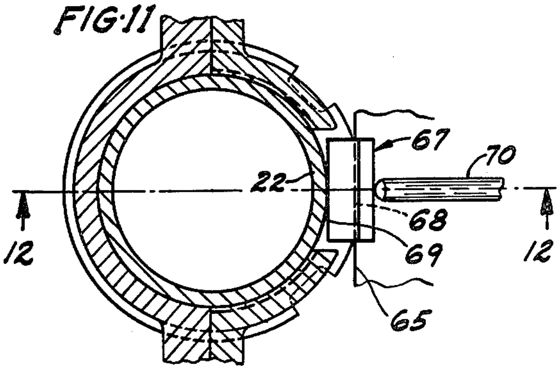
FIG. 11 is an enlarged fragmentary cross-sectional view taken along lines 11—11 of FIG. 1, showing the radial arm clamp shoe and arm elevating tube.

The composite index pin 52 comprises two identical pin elements 55 and 56 arranged one above the other in a substantially square passageway 57 extending through the casing 53. The pin elements 55 and 56 are of rectangular cross-sectional configuration, and when placed together as shown, their joint cross-sectional shape and dimensions are substantially the same as passageway 56. Both vertical sides 58 of the notches 51 in index ring 47 and one of the vertical sides 59 at one end of each of the pin elements are similarly tapered and lie on lines diverging similarly from a point on the longitudinal center line of the pins and passageway 57 passing through the center of index ring 47. The opposite vertical sides 60 of each of the pin elements, while being parallel with the sides 58 of the notches, are, however, offset inwardly as shown in FIG. 8, so that the side 60 of each of the pin elements is slightly spaced from the sides 58 of the notches when the pin elements are aligned as shown and inserted into a notch 51.

In the above-described arrangement, the opposite sides 59 of the pin elements are spaced so as to have a tight fit relationship in the notches 51 when the longitudinal center line of both pin elements exactly intersect the center of index ring 47. However, because of the opposite offset sides 60 of the pin elements and because of their free sliding fit in passageway 57, the forward tapered portions of the pin elements are permitted to move sidewise slightly as they are entered into the notches 51, thereby permitting easy entry of the pins into the notches by the biasing spring 54. Each of the pin elements 55 and 56 will therefore be held tightly between a surface 58 of a notch 51 and opposite vertical sides of the passageway 57 near the ends thereof, thereby eliminating any looseness of the radial arm in an indexed position. The spacing of the sides 59 of the opposite pin elements is such that their straight vertical sides engage the opposite vertical sides of the passageway 57 before they bottom in notches 58.

Toward their other ends, the pin elements 55 and 56 have aligned through bores 61, which receive the right angularly formed end of a round actuating rod 62, and are further provided with meeting semicylindrical rear end portion 63 which are received in the biasing spring 54. The casing 53 is rigidly connected to the radial arm 39 by screws 64 which pass through an angle bracket 65 having its horizontal leg 66 lying on the upper surface of casing 53, see FIGS. 1 and 2.

Means to clamp the radial arm 39 in infinitely variable miter positions as well as in indexed positions includes a clamp shoe 67 having a straight side 68 rockably supported on the end of the horizontal bracket leg 66 and having an opposite surface portion 69 engaging an arcuate surface portion of arm support tube 22, see FIGS. 1, 2, 11, and 12. The rockably mounted clamp shoe 67 is engaged by the end of an actuating push rod 70 at a point thereon spaced further from its pivotal contact with bracket leg 66 than is the contact surface 69, thereby to provide force multiplication.

Figure 2:
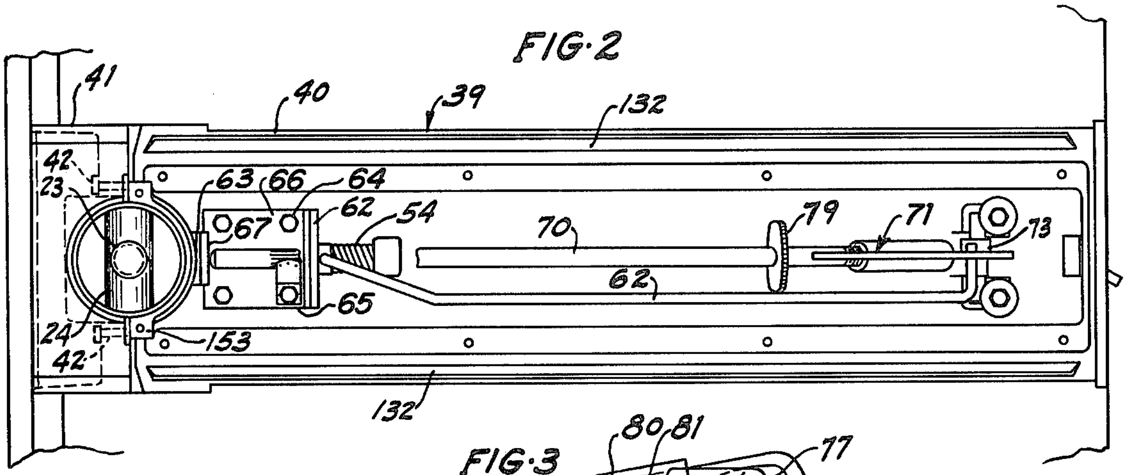
FIG. 2 is a top plan view of the saw shown in FIG. 1 with the radial arm cover and miter scale and indicator removed.
Figure 3:
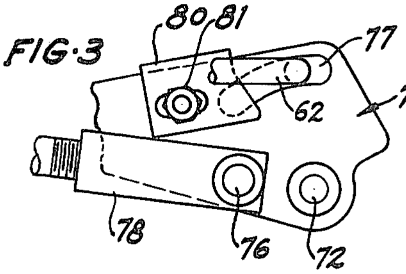
FIG. 3 is an enlarged fragmentary detail view showing the arm indexing rod adjustment means.

The index pin actuating rod 62 and clamp shoe push rod 70 extend longitudinally toward the forward free end of the radial arm 39 and are operatively connected to an operating lever 71, see FIGS. 1, 2, and 3. The lever 71 is pivotally journalled at one end on a pivot 72, mounted in a boss 73 in the floor of the radial arm, and extends upwardly therefrom to an exterior free end through a slit in arm cover panel 74. The exteriorly projecting free end of lever 71 is provided with a handle 75. The clamp shoe push rod 70 is pivotally connected to lever 71 by a pivot 76 positioned relatively close radially to the lever pivot point 72. The connected end of index pin actuating rod 62 is formed at ninety degrees and extends through an arcuate slot 77 in lever 71. The center of the arcuate slot 77 coincides with that of pivot 72. The arcuate slot 77 is further spaced radially from lever pivot 72 than is the pivotal connection 79 of push rod 70.

In FIG. 1, the lever 71 is shown in a locked arm clamping position in which the pivot points 76 and 72 are in a slightly over-center position with respect to a line passing through pivot point 72 and the point of contact of rod 70 with the clamp shoe 67. In this over-center position, sufficient force is applied to clamp shoe 67 to clamp the radial arm against rotative movement on the tube 22, and the lever is detained from rotation in a direction to release the clamp shoe. Also, in this position, the index pin rod 62 is in a free position; that is, its 90-degree formed end portion is spaced from the left end of slot 77 so that the biasing spring 54 may freely urge the index pins into a registering notch in index ring 47.

When lever 71 is rotated clockwise, as indicated by the arrow, from the locked position shown to an intermediate position wherein index pin actuating rod 62 is still spaced from the left end of slot 77, the clamp shoe 67 will be released and the radial arm may be rotated angularly to another miter position provided it was not in an indexed position. In order to withdraw the index pin and release the arm from an indexed position, the lever 71 is moved further clockwise from this intermediate position to a fully released position, thereby causing the formed end of rod 62 to be engaged by the left end of slot 77 and thereby withdrawing the index pin from the index ring 47. Movement of the lever 71 is a counterclockwise direction from this fully released position to the intermediate position will permit the index pins to enter a notch in index ring 47 so that the radial arm will be held in an indexed position only by the index pin.

Adjustment of the clamp shoe push rod 70 is accomplished by screw threadedly engaging its end in a ferrule member 78 pivotally connected to lever 71 by the pivot 76 and in providing a knurled wheel 79 splined to the rod 70. The knurled wheel 79 is accessible through an aperture in the floor of the radial arm. Adjustment of the point of contact of the index pin actuating rod 62 with the left end of slot 77 is provided by a slotted adjustable dog member 80 adjustably connected to lever 71 by a bolt 81 passing through a slot in dog 80 and clamping the dog in an adjusted position, see FIG. 3.

Referring to FIGS. 13 to 19, a circular saw blade 82 is mounted on the shaft of an electric motor 84. The electric motor is supported in the downwardly extending legs 85 of a yoke 86 for rotative movement about an axis perpendicular to its shaft 83, see FIG. 14. A bevel index ring 87 rigidly attached to a flange 88 on the front side of the motor casing by four screws 89 passing through clearance holes in the index ring 87 and in a retainer plate 90 forms a front trunnion journalled in a split bearing. The split bearing, see FIGS. 13 to 15, comprises an upper half 91 formed in the front yoke leg 85 and a lower half 92 formed in a detachable bearing cap 93, see FIG. 15. The bearing cap 93 is attached to the front yoke leg 85 by screws 94 and 95.

A bevel index pin 96 is reciprocally guided in a vertical passageway 97 formed in a boss 98 on the front leg 85 of yoke 86. The index pin 96 comprises a lower cylindrical portion 99 biased downward by a spring 100 to enter any of the notches 101 in index ring 87, thereby to index the saw blade in a selected bevel position. The index pin 96 also comprises an upper smaller diameter rod portion 102 which extends upwardly and exteriorly of the passageway 97 and has a right angularly formed exterior end portion 103 and a knob 104 at the end of portion 103.

Figure 15:
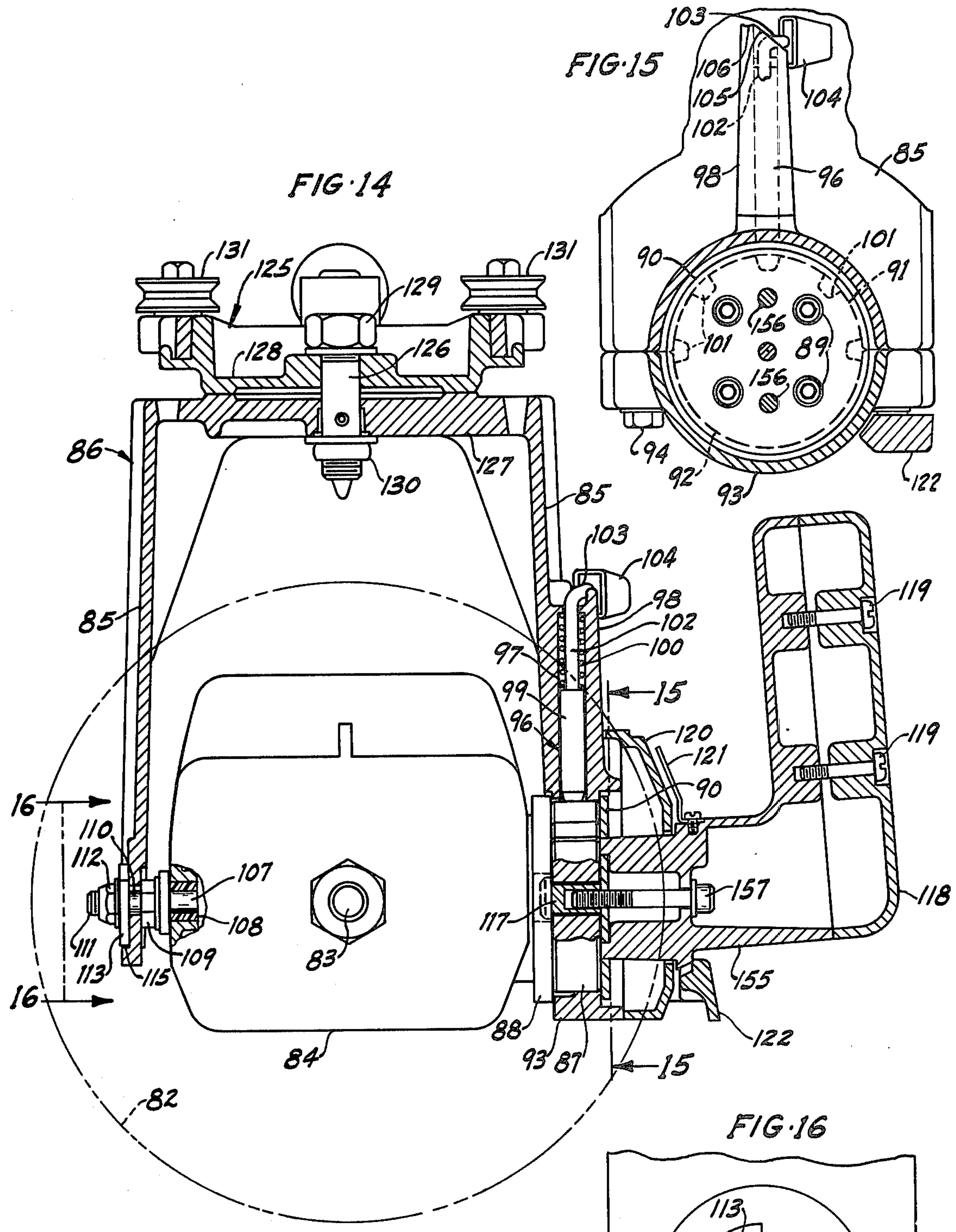
FIG. 15 is a fragmentary cross-sectional view taken along lines 15—15 of FIG. 14.
Figure 16:
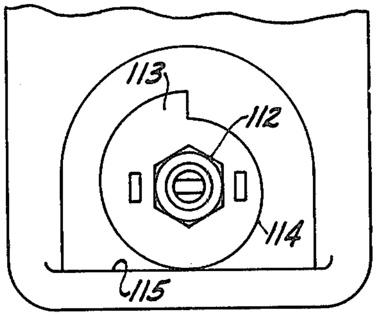
FIG. 16 is a fragmentary elevational view of the motor shaft heel adjustment cam taken along lines 16—16 of FIG. 14.
Figure 18:
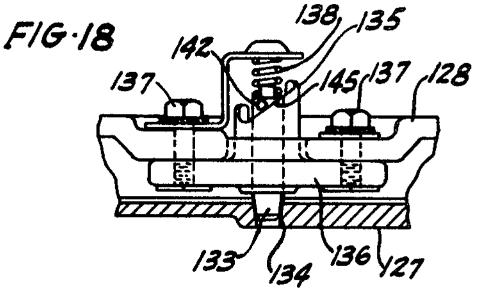
FIG. 18 is a fragmentary elevational view taken along lines 18—18 of FIG. 17, showing the motor yoke indexing pin ramp.
Figure 17:
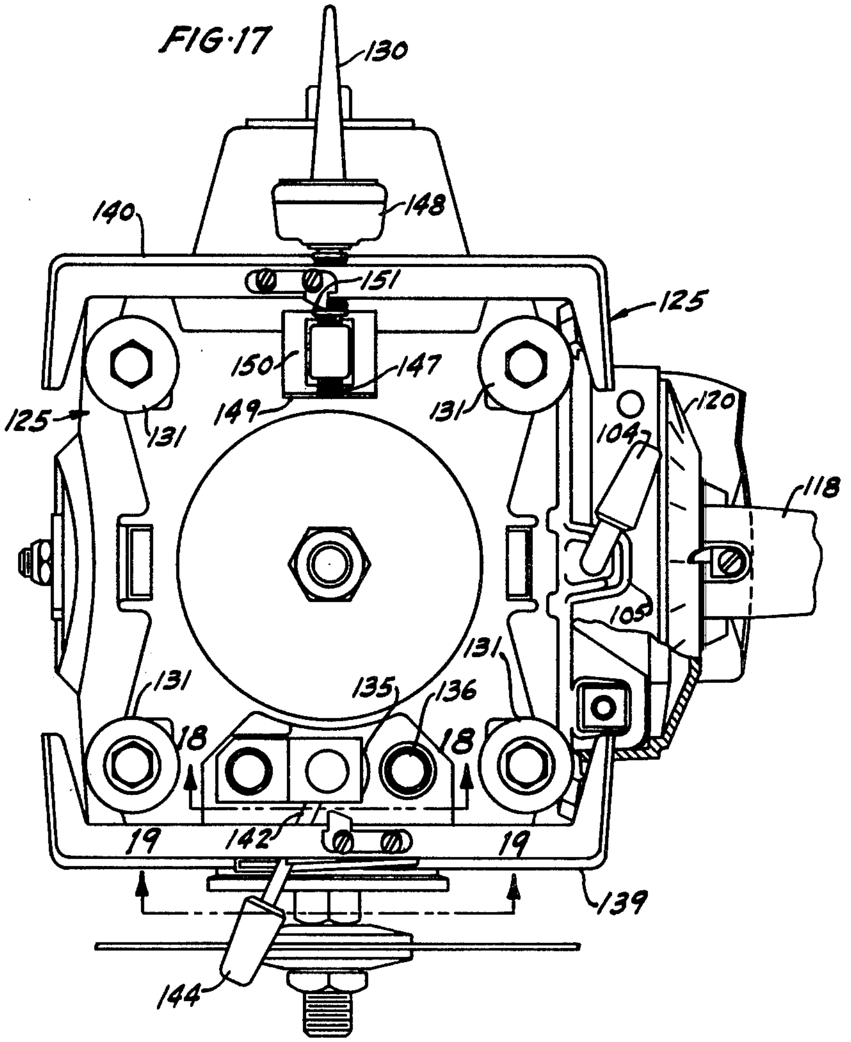
FIG. 17 is a top plan view of the saw motor yoke and carriage assembly.
Figure 19:
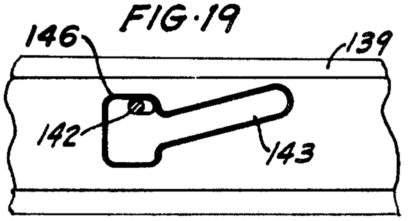
FIG. 19 is a fragmentary elevational view taken along lines 19—19 of FIG. 17, showing the motor yoke indexing pin handle in a latched position.

The upper end surface of the boss 98 has an intermediate transverse inclined surface portion or ramp 105 terminating at each end in upper and lower horizontal surface portions, upon which surface portions the right angularly formed portion 103 of rod portion 102 of the index pin slides, see FIGS. 14 and 15. Preferably, the upper horizontal surface portion is provided with a detent notch 106 to detain rod portion 103 when it is swung to that position. When rod portion 103 is resting upon the lower horizontal surface portion, the pin may enter a registering notch 101 in the index ring under the bias of spring 100. When it is desired to compress spring 100 and withdraw the pin from an indexing notch, the knob 104 is swung clockwise, thereby moving the rod portion 103 up the ramp surface 105 into detent notch 106 on the upper horizontal surface portion. When in this position and it is desired to permit the index pin to enter a notch in the index ring, the knob 104 is merely swung sufficiently counterclockwise to move rod portion 103 out of detent notch 106 to the ramp surface 105 whereafter spring 100 will cause rod portion 103 to rotate down the ramp and insert the pin 96 into a registering index notch. This arrangement provides particularly convenient operation with minimum effort.

At its rear side, the electric motor 84 rotates on the inner end portion of a stud 107. A rubberlike bushing 108 surrounds the inner end portion of the stud, see FIGS. 14 and 16. An intermediate portion 109 of stud 107 is hexagonal and bears against the inside or rear yoke leg 85, and an adjacent intermediate cylindrical portion 110 thereof passes through an enlarged clearance hole in the leg 85. The outer end 111 of stud 107 is screw threaded and receives a nut 112. Between nut 112 and the outer face of yoke leg 85 is a disc cam 113 having a central clearance aperture for the threaded outer portion 111 of stud 107 to pass through. When nut 112 is tightened the cam 113 and hexagonal stud portion 109 are tightly clamped against opposite sides of yoke leg 85.

The peripheral cam surface 114 of cam 113 engages the surface of a straight horizontal ledge 115 on yoke leg 85 projecting axially outward, thereby to hold the rear trunnion of the motor casing in a vertically adjusted position. When it is desired to heel adjust the axis of the motor casing, the nut 112 is loosened sufficiently to permit rotation of the cam. Rotation of cam 113 in a clockwise direction will lower the motor axis at the rear end and counterclockwise rotation of the cam will raise the near end of the motor axis. The difference in diameter of the intermediate stud portion 110 and the enlarged clearance hole in leg 85 is sufficient to permit the relatively slight vertical adjustments of the motor casing axis to achieve alignment.

A handle 155 for rotating the motor casing 84 to various bevel positions has a pair of round driving lugs 156 which enter holes in the retainer plate 90, and the handle is attached to index ring 84 by a screw 157 engaged in a headed internally screw threaded bushing 117 extending through the index ring 87. The handle 155 is hollow and has a cap portion 118 attached to the main handle portion by screws 119. Suitably attached to the front yoke leg 85 is a bevel indicating bezel 120 and an indicating pointer 121 is attached to the handle 155.

In order to clamp the motor casing in any indexed or intermediate bevel position, the split bearing is so dimensioned that when both bearing cap screws 94 and 95 are pulled up tight the index ring 87 is firmly clamped and any movement thereof is prevented. To release the index ring from this clamped condition so that the motor casing may be rotated from one bevel position to another, the right-hand bearing cap screw 95 is loosened sufficiently to permit this movement. In the preferred embodiment, the right-hand bearing cap screw 95 has a left-hand screw thread engaging a left-hand internal screw thread in the yoke leg 85.

To facilitate the required tightening or loosening of bearing cap screw 95, so as to clamp or release the index ring, a lever 122 is adjustably connected at one end to the head end of screw 95 by a screw 123 threadedly engaged in an axial screw-threaded bore in screw 95. The head of screw 95 is non-circular, preferably hexagonal, and nests in a recess 124 in lever 122 of similar configuration, so that there is no relative rotation of the lever 122 and screw 95. The lever 122 may, however, be angularly adjusted on the screw 95 at sixty angular degree increments when the head of screw 95 and recess 124 are made hexagonal. Such adjustment is essential to compensate for manufacturing tolerances and wear. Lever 122 is shaped to conform with the arcuate outline of bearing cap 93. When in the position shown in FIGS. 13 and 14, the index ring 87 is in a clamped condition. To release the index ring, the left end of lever 122 is pulled outwardly with reference to FIG. 13.

The yoke 86 is pivotally connected to a carriage 125 for rotation thereon by a vertical stud 126 passing through the horizontal yoke portion 127 and the floor 128 of the carriage. The stud 126 has a nut 129 threadedly engaged on its upper end bearing against the floor of the carriage and a yoke lock lever 130 threadedly engaged on the lower end of the stud and bearing against the underside by yoke portion 127. The carriage 125 has four V-groove rollers 131 rotatably mounted thereon which engage tracks 132 fixed on the sides of radial arm 39 and support and guide the carriage for longitudinal movement along the radial arm. The yoke may be indexed in ninety-degree angularly spaced crosscut and rip positions on carriage 125 by a vertically arranged retractable index pin 133 arranged to enter perforations 134 in the upper horizontal portion 127 of the yoke 86, see FIGS. 13, 14, 17, and 18.

The index pin 133 is slidably mounted in a vertical passageway formed in the vertically arranged cylindrical portion 135 of a guide member 136 attached to the floor 128 of carriage 125 by bolts 137. The pin 133 is biased downward into a registering perforation 134 by a spring 138, see FIGS. 17 and 18. Rigid left and right-hand cover members 139 and 140, respectively, are attached to the sides of carriage 125 by screws 141, see FIGS. 13 and 17. A horizontally arranged operating rod 142 is attached to the upper end of index pin 133 and extends radially through an elongated inclined aperture 143 in carriage cover 139, see FIG. 19. At its outer end the operating rod 142 is provided with a knob 144. The upper end of the vertical cylindrical portion 135 of guide member 136 has a transverse inclined surface portion 145 upon which the horizontal operating rod 142 rides upward and effects withdrawal of the index pin 133 from an aperture 134 when the operating rod 142 is swung toward the right in FIG. 17 to effect counterclockwise rotation of the index pin 133. The elongated inclined aperture 143 in carriage cover 139 is provided with a vertical detent surface 146 at the lower end of the upper inclined surface of aperture 143 to detain the operating rod 142 and prevent inadvertent withdrawal of the index pin 133.

The carriage 125 is clamped in a crosscut or rip position by tightening the yoke lock lever 130 on stud 126. The carriage 125 is clamped against longitudinal movement along the radial arm by a screw 147 having a knob 148 at its outer end see FIGS. 13 and 17. At its inner end the screw 147 bears against the upturned leg 149 of a slidable lock shoe 150, and the leg 149 bears against the radial arm when the screw is tightened. There are scales (not shown) along both sides of radial arm 39, and there are indicating pointer elements 151 attached to both sides of carriage 125 to indicate the carriage position along the arm. There is also an annular member 152 having a miter scale thereon surrounding the upper end of support tube 22 and attached to the arm by screws threadedly engaged in threaded holes 153, see FIGS. 1 and 2. An adjustable round indicator cap 154, overlying the miter scale member 152, encloses the upper end of tube 22 and is frictionally engaged on the upper end of support tube 22 for rotative adjustment and includes a pointer 158 for indicating miter positions of the arm.

We claim:

1. In a radial arm saw having a base and a worktable mounted thereon, a vertical, hollow, cylindrical support column mounted on said base, a vertical cylindrical member slidably mounted in said support column, and a radial arm mounted for rotation on an upper exteriorly extending end portion of said cylindrical member, said hollow support column comprising two semicylindrical sections each having connecting lugs extending longitudinally along both sides thereof and said sections being connected by longitudinally spaced bolts connecting the meeting lugs of said sections, the walls of said connected column sections being spaced from said cylindrical member and each of said sections having a plurality of longitudinally spaced guide pads on the walls thereof extending radially inward and having arcuate surfaces contiguous with and substantially the same curvature as the surface of said cylindrical member, said guide pads on said opposite column sections being transversely aligned in pairs and having such radial inward extension that said cylindrical member is tightly gripped and said support column walls are flexed when said connecting bolts are tightened sufficiently, whereby a uniform sliding fit of said cylindrical member in said longitudinally spaced guide pads may be achieved by individual adjustment of said longitudinally spaced connecting bolts.

2. The radial arm saw claimed in claim 1 in which said connecting bolts are transversely aligned in pairs with said aligned pairs of guide pads.

3. The radial arm saw claimed in claim 1 in which said guide pads are formed as an integral part of the walls of said support column.

4. A radial arm saw having a vertical support column, a cylindrical member vertically slidable therein, and a radial arm mounted for rotation on an upper end portion of said cylindrical member, said support column comprising two semicylindrical sections each having connecting lugs extending longitudinally along both sides thereof and said sections being connected by longitudinally spaced bolts connecting the meeting lugs of said sections, the walls of said connected support column sections being spaced from said cylindrical member and having longitudinally spaced guide pads thereon engaging the surface of said cylindrical member in sliding fit relationship, means for further guiding vertical sliding movement of said cylindrical member and for preventing any rotative movement thereof, comprising; a guide strip attached to the surface of said cylindrical member and extending longitudinally thereof, said guide strip being entered into a longitudinally extending recess one half of which recess is formed in each of two meeting flanges of said support column, a pair of longitudinally extending gib members in said recess lying against opposite sides of said guide strip, and means for adjusting at least one of said gib members toward and away from a side of said guide strip.

5. The radial arm saw claimed in claim 4 in which said means for adjusting said gib member toward and away from a side of said guide strip comprises at least two longitudinally spaced set screws threadedly engaged in one of said support column sections and bearing at their ends against said gib member at longitudinally spaced points thereon, whereby alignment of said gib member may also be adjusted.

6. In a radial arm saw having a radial arm rotatably mounted on a vertical cylindrical member, means for releasably clamping said arm in selected angular positions about said member comprising a clamp shoe mounted for rotation on said arm adjacent said member, said clamp shoe having a surface portion engaging the surface of said cylindrical member thereby to clamp said arm against rotative movement when said clamp shoe is rotated in one direction with sufficient force, push rod means having one end thereof engaging said clamp shoe at a point thereon spaced farther from its axis of rotation than is said surface portion thereof, the other end of said push rod being pivotally connected to a lever pivotally mounted on said arm, said push rod being of such length that a maximum force is applied to said clamp shoe to rotate it in a direction to clamp said arm when said lever is rotated in one direction to a position wherein the point of contact of said push rod with said clamp shoe, its point of pivotal connection with said lever, and the axis of rotation of said lever are in alignment, and said lever being rotatable in said one direction slightly past said aligned position to an over-center position, thereby to detain said clamp shoe, push rod, and lever in an arm clamping position.

7. The radial arm saw claimed in claim 6 which includes means for adjusting the effective length of said push rod, which comprises providing a ferrule pivotally connected to said lever and having a screw threaded bore receiving a screw threaded end of said push rod and in providing a thumb wheel fixed on said push rod intermediate of its length.

8. In a radial arm saw having a radial arm rotatably mounted on a vertical cylindrical member, means for selectively indexing said arm in angularly spaced miter positions about the axis of said member comprising; an index ring surrounding and fixed to said member and having a plurality of angular spaced notches in the periphery thereof with outwardly diverging vertical sides, a composite index pin of rectangular cross-section freely slidable longitudinally in a horizontal passageway of rectangular cross-section formed in a member fixed to said arm, said composite pin comprising two pin elements of rectangular cross-section arranged one above the other in said passageway and having end portions extending from both ends of said passageway, said extending portions at one end of said passageway being tapered with outwardly converging vertical sides for entry into said notches, the other extending end portions of said pin elements being connected to an actuating member for withdrawing said pin elements from said notches, means biasing said composite pin toward said index ring, one converging side of one pin element and the opposite converging side of the other pin element being so spaced as to permit their free complete entry into said notches, the other opposite converging sides of said pin elements being spaced so as to contact the diverging vertical sides of said notches as they are entered therein, whereby the tapered ends of said pin elements are caused to move sidewise slightly toward each other when said composite pin is entered into one of said notches thereby to cause the contact of opposite vertical sides of said pin element with opposite vertical sides of said passageway.

9. The radial arm saw claimed in claim 8 which further includes an annular shoulder on said vertical cylindrical member for supporting said index ring, in which the rotatably mounted end of said radial arm is supported on said index ring, and in which said index ring is angularly adjustable around said member and fixed in an adjusted position by set screws passing through said ring and bearing against said member.

* * * * *